US012383778B2

(12) United States Patent
Cha

(10) Patent No.: US 12,383,778 B2
(45) Date of Patent: Aug. 12, 2025

(54) FIXING DEVICE FOR FIREFIGHTING PIPE

(71) Applicant: Jong Hyeon Cha, Daejeon (KR)

(72) Inventor: Jong Hyeon Cha, Daejeon (KR)

(73) Assignee: Jong Hyeon Cha, Daejeon (KR)

( * ) Notice: Subject to any disclaimer, the term of this patent is extended or adjusted under 35 U.S.C. 154(b) by 421 days.

(21) Appl. No.: 17/997,890

(22) PCT Filed: Mar. 24, 2021

(86) PCT No.: PCT/KR2021/003671
§ 371 (c)(1),
(2) Date: Nov. 3, 2022

(87) PCT Pub. No.: WO2021/225276
PCT Pub. Date: Nov. 11, 2021

(65) Prior Publication Data
US 2023/0149755 A1    May 18, 2023

(30) Foreign Application Priority Data
May 4, 2020   (KR) .................. 10-2020-0053171

(51) Int. Cl.
*A62C 35/68* (2006.01)
*B05B 15/60* (2018.01)
(52) U.S. Cl.
CPC ............. *A62C 35/68* (2013.01); *B05B 15/60* (2018.02)
(58) Field of Classification Search
CPC ........ B05B 15/60; A62C 35/68; F16L 3/1083; F16L 3/105; F16L 3/085; F16L 3/245; F16L 3/003; F16L 3/04; F16B 2/065
See application file for complete search history.

(56) References Cited

U.S. PATENT DOCUMENTS

| 8,491,061 B2 * | 7/2013 | Breault | E21F 17/02 299/95 |
| 9,308,407 B2 * | 4/2016 | Jung | F16L 3/003 |
| 2010/0237201 A1 * | 9/2010 | Oh | B05B 15/62 248/74.2 |

(Continued)

FOREIGN PATENT DOCUMENTS

| JP | 07-035267 A | 2/1995 |
| KR | 10-0441679 B1 | 7/2004 |
| KR | 20-0410594 Y1 | 3/2006 |

(Continued)

OTHER PUBLICATIONS

Bibliographic Data including English Abstract for KR patent application No. 1020010080731 cited as Patent Document 1 at paragraph [05] on p. 3 of the substitute specification (see Foreign Patent Document Cite No. 1), 2 pages.

(Continued)

*Primary Examiner* — Tuongminh N Pham
(74) *Attorney, Agent, or Firm* — Francis J. Maguire; WARE FRESSOLA MAGUIRE & BARBER LLP

(57) ABSTRACT

A vertical firefighting pipe (2) is holdable in a seating part (14) of a holder (10) next to a horizontal square pipe (1) insertable between a side plate (13) and a guide pin (31) in the holder, the firefighting pipe holdable in the seating part by a fastening screw (50) in a pressing plate (40) insertable between a pressing plate guide pin (30) and a cover plate (20) of the holder.

4 Claims, 4 Drawing Sheets

(56) References Cited

U.S. PATENT DOCUMENTS

2020/0078625 A1    3/2020   Mitchell et al.

FOREIGN PATENT DOCUMENTS

KR         10-1813010 B1    12/2017
KR     10-2019-0093920 A     8/2019

OTHER PUBLICATIONS

Bibliographic Data including English Abstract for KR patent application No. 1020180013336 cited as Patent Document 2 at paragraph [06] on p. 3 of the substitute specification (see Foreign Patent Document Cite No. 2), 3 pages.

Translation of the International Search Report (ISR) for International Application No. PCT/KR2021/003671, mailed Jul. 20, 2021, 3 pages.

Bibliographic Data including English Abstract for KR patent publication No. 10-1813010 B1 as Foreign Patent Document Cite No. 4, 1 page.

Bibliographic Data including English Abstract for KR patent publication No. 20-0410594 Y1 as Foreign Patent Document Cite No. 5, 1 page.

* cited by examiner

FIXING DEVICE FOR FIREFIGHTING PIPE

BACKGROUND OF THE INVENTION

Field of the Invention

The present invention relates to a fixing device for a firefighting pipe, and more specifically, to a firefighting pipe fixing device for conveniently fixing an end portion of a firefighting pipe, on which a sprinkler is mounted, on a bar installed on the ceiling of a building.

Background Art

In case of fire, sprinklers are mounted at regular intervals to spray firewater from the ceiling of a building. An end portion of a firefighting pipe is connected to each sprinkler, and is fixed by using various structures pre-installed on the ceiling of the building. Of course, in a case in which there is no proper structure on which the firefighting pipe is installed, a separate frame can be constructed. Hereinafter, a structure installed on the ceiling of a building will be described. Such a structure may include a square pipe illustrated in FIG. 1.

FIG. 1 illustrates an installed state of a fixing device for fixing an end portion of a firefighting pipe 2 to a square pipe 1 installed on the ceiling. The fixing device includes: a bracket 100 having an upper plate 110, a lower plate 120 and a side plate 130 by being bent in the form of a "⊏" shape; round holes 111 respectively perforated in the upper plate 110 and the lower plate 120 so that a firefighting pipe 2 having a sprinkler 3 mounted at an end thereof can be inserted into the round holes 111; and two fixing screws 140 screw-coupled to the side plate 130 so as to press and fix the firefighting pipe 2 by the square pipe 1 inserted into a space between the upper plate 110 and the lower plate 120.

In order to insert the firefighting pipe 2 into the round holes 111 of the upper plate 110 and the lower plate 120, the firefighting pipe 2 must be at right angles to the upper plate 110 and the lower plate 120, and the upper portion must secure a space in some degree. However, it is difficult to easily perform work since the firefighting pipe is installed in a limited space of the ceiling. Moreover, since the firefighting pipe 2 on which the sprinkler 3 is mounted is connected to a main pipe, it is difficult to freely control the firefighting pipe 2, namely, it is inconvenient to fix the firefighting pipe 2 since it is not easy to exactly insert the firefighting pipe 2 into the round holes 111.

PATENT LITERATURE

Patent Documents

Patent Document 1: Korean Patent Application No. 10-2001-0080731
Patent Document 2: Korean Patent Application No. 10-2018-0013336

SUMMARY OF THE INVENTION

Accordingly, the present invention has been made to solve the above-mentioned problems occurring in the prior art, and it is an object of the present invention to provide a firefighting pipe fixing device for fixing an end portion of a firefighting pipe, to which a sprinkler is connected, on a square pipe installed on the ceiling of a building. In more detail, an object of the present invention is to provide a firefighting pipe fixing device capable of minimizing movement of a firefighting pipe and conveniently fixing the firefighting pipe.

To accomplish the above object, according to the present invention, there is provided a firefighting pipe fixing device for vertically fixing a firefighting pipe to a square pipe horizontally fixed and mounted near the ceiling of a building, the firefighting pipe fixing device including: a holder having an upper plate, a lower plate and a side plate by being bent in the form of a "⊏" shape, and a square pipe insertion path through which the square pipe passes; pipe seating parts formed in the upper plate and the lower plate in a "∩" shape so as to be open at one side and to have a width into which the firefighting pipe is inserted; a pipe pressing part inserted into the pipe seating parts for closely fixing the firefighting pipe, which perpendicularly passes through the upper plate and the lower plate, to the side surface of the square pipe inserted into the square pipe insertion path, wherein the pipe pressing part comprises: a cover plate fixed at end portions of the upper plate and the lower plate of the holder to be parallel with the side plate; a pressing plate inserted into the holder to be located between the firefighting pipe and the cover plate; and a fastening or fixing screw to be screw-coupled to the pressing plate so that the front end presses the side wall of the firefighting pipe.

According to another feature of the present invention, the pressing plate is inserted into the holder in a sliding manner and pressing plate guide pins are mounted between the upper plate and the lower plate in order to guide the direction that the pressing plate is inserted.

According to another feature of the present invention, the cover plate has a guide groove formed in the horizontal direction so that the fixing screw can move in a state in which the fixing screw is coupled to the pressing plate.

According to another feature of the present invention, the pressing plate has a stopper protruding at an end thereof to accurately locate the fastening screw at the center of the opening portions so as to limit the length that the pressing plate is inserted.

According to an embodiment of the present invention, the firefighting pipe fixing device can conveniently and rapidly fix the end portion of the firefighting pipe, to which the sprinkler is connected, on the square pipe installed on the ceiling of a building. In more detail, a worker can fix the firefighting pipe just by slightly moving the firefighting pipe in the back-and-forth direction without moving it in the vertical direction, so that the end portion of the firefighting pipe on which the sprinkler is mounted can be easily fixed.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION

Figure 1:
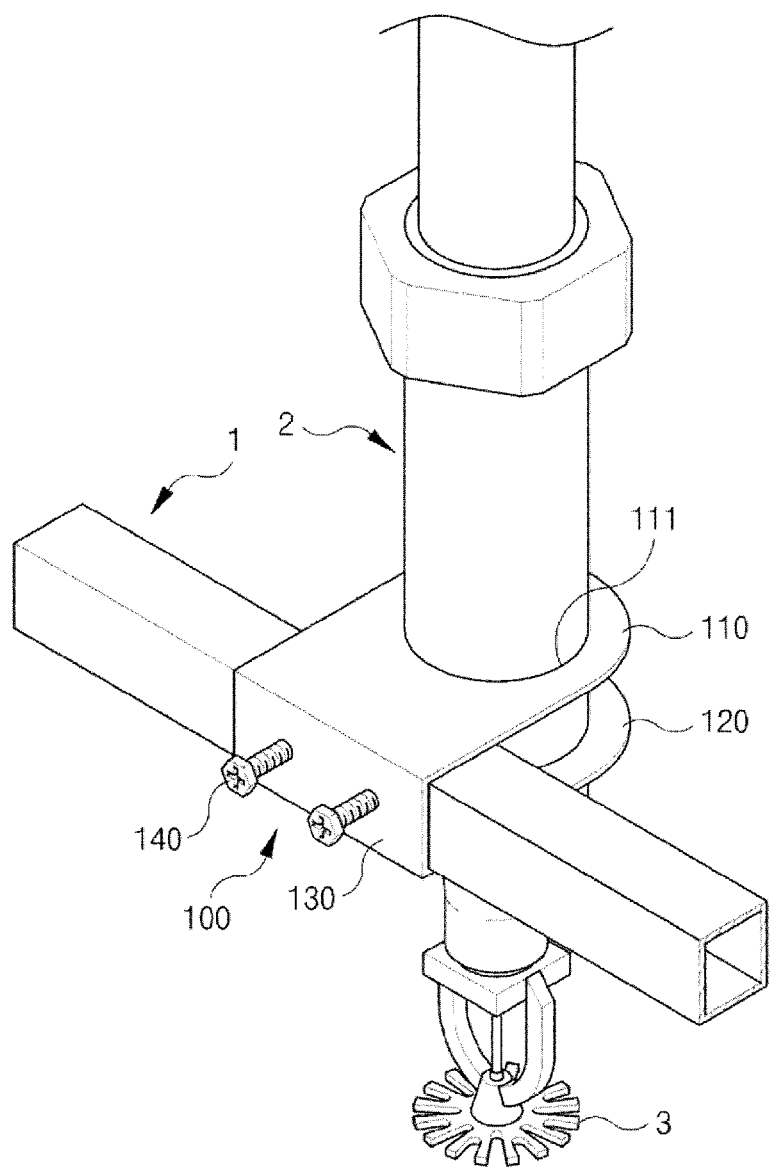
FIG. 1 is a perspective view illustrating an installed state of a conventional firefighting pipe fixing device.

Hereinafter, with reference to the attached drawings, an embodiment of the present invention will be described in detail with reference to FIGS. 2 to 4.

A firefighting pipe fixing device according to an embodiment of the present invention is to vertically fix a firefighting pipe 2 to a square pipe 1 horizontally fixed and installed near to the ceiling of a building. Especially, the firefighting pipe 2 may be an end portion of the firefighting pipe on which a sprinkler 3 is mounted. However, with respect to a specific use purpose, the end portion of the firefighting pipe is just an example, and the firefighting pipe fixing device according to the present invention is not limited thereto.

The firefighting pipe fixing device according to the embodiment of the present invention includes a holder 10, a pipe seating part 14, and a pipe pressing part.

The holder 10 having a square pipe insertion path is formed by bending a metal plate in the form of a "⊏" shape. The holder 10 includes an upper plate 11, a lower plate 12, and a side plate 13. The thickness of the holder 10 which corresponds to the height of the side plate 13 corresponds to the length of one side of the square pipe so that the square pipe can pass through.

The upper plate 11, the lower plate 12 and the side plate 13 of the holder 10 respectively get in contact with three sides of the square pipe 1 having a square cross section.

In order to guide the length to which the square pipe 1 is inserted, a square pipe guide pin 31 may be mounted. The square pipe guide pin 31 may be provided in a plural number in such a way that an upper end of the square pipe guide pin 31 is connected to the upper plate 11 and a lower end is connected to the lower plate 12.

The pipe seating part 14 (see FIG. 2) is provided such that the firefighting pipe 2 is seated and fit to the holder 10 to be in the perpendicular direction to the square pipe 1. The pipe seating part 14 has opening portions 111 and 121 respectively formed in the upper plate 11 and the lower plate 12 in a "∩" shape to be opened at one side and to have a width W into which the firefighting pipe 2 is inserted. A linear distance L ranging from the side plate 13 of the holder 10 to start points of the opening portions 111 and 121 is shorter than the length of one side of the square pipe 1.

Through the above structure, the square pipe 1 can be inserted in parallel with the holder 10, and the firefighting pipe 1 can be inserted in the perpendicular direction to the holder 10. Especially, according to the present invention, the firefighting pipe 1 is moved in the perpendicular direction to the upper and lower plates 11 and 12 of the holder 10, namely, in the arrow direction (D) of FIG. 2, so as to be seated on the holder 10.

The pipe pressing part is a means for closely fixing the firefighting pipe 2 perpendicularly passing through the upper plate 11 and the lower plate 12 to the side of the square pipe 1 inserted into the square pipe insertion path.

The pipe pressing part includes cover plates 20 and 20', a pressing plate 40, and a fastening screw 50. The cover plates 20 and 20' are fixed while surrounding end portions of the upper plate 11 and the lower plate 12 of the holder 10 to be in parallel with the side plate 13. Of course, the cover plates 20 and 20' are mounted not to hide the opening portions 111 and 121. The cover plates 20 and 20' may be fixed by welding, and as occasion demands, may be provided integrally with the upper and lower plates 11 and 12.

The pressing plate 40 is inserted into the holder 10 in such a way as to be interposed between the firefighting pipe 2 seated on the pipe seating part and the cover plates 20 and 20' fixed at the end portions of the upper and lower plates 11 and 12. The pressing plate 40 is inserted into the holder 10 in the same direction K as an extension direction of the square pipe 1.

As illustrated in the drawings, the pressing plate 40 has a cross section formed in a "⊐" shape in the longitudinal direction. The pressing plate 40 has a screw hole 41 for fastening the fastening screw 50.

The fastening screw 50 is screw-coupled to the screw hole 41 of the pressing plate 40 so that the front end of the fastening screw 50 presses the side wall of the firefighting pipe 2 according to a coupling degree.

The pressing plate 40 is inserted into the holder 10 in a sliding manner. In order to guide the direction that the pressing plate 40 is inserted, pressing plate guide pins 30 are mounted between the upper plate 11 and the lower plate 12. The pressing plate guide pins 30 serve to guide the pressing plate 40 and fix one of the cover plates to the upper and lower plates 11 and 12.

According to the present invention, the cover plate 20 or 20' has a guide groove 21 formed in the horizontal direction, namely, in a direction parallel to the upper and lower plates 11 and 12, so that the fixing screw 50 can move in a state in which the fixing screw 50 is coupled to the pressing plate 40.

Now, a using method of the fixing device for the firefighting pipe according to the present invention will be described.

The fixing device for the firefighting pipe according to the present invention is used in a state in which the fixing screw 50 is slightly coupled to the screw hole 41 after the pressing plate 40 is previously inserted into the holder 10. A worker inserts the fixing screw 50 into the guide groove 21 so that the pressing plate 40 opens the opening portions 111 and 121 to seat the firefighting pipe 2 in the opening portions 111 and 121.

Thereafter, when the worker removes the fastening screw 50 from the guide groove 21 after seating the firefighting pipe 2 on the pipe seating part, the pressing plate 40 closes the opening portions 111 and 121. After that, the worker tightens the fastening screw 50 to fix the firefighting pipe 2.

Figure 4:
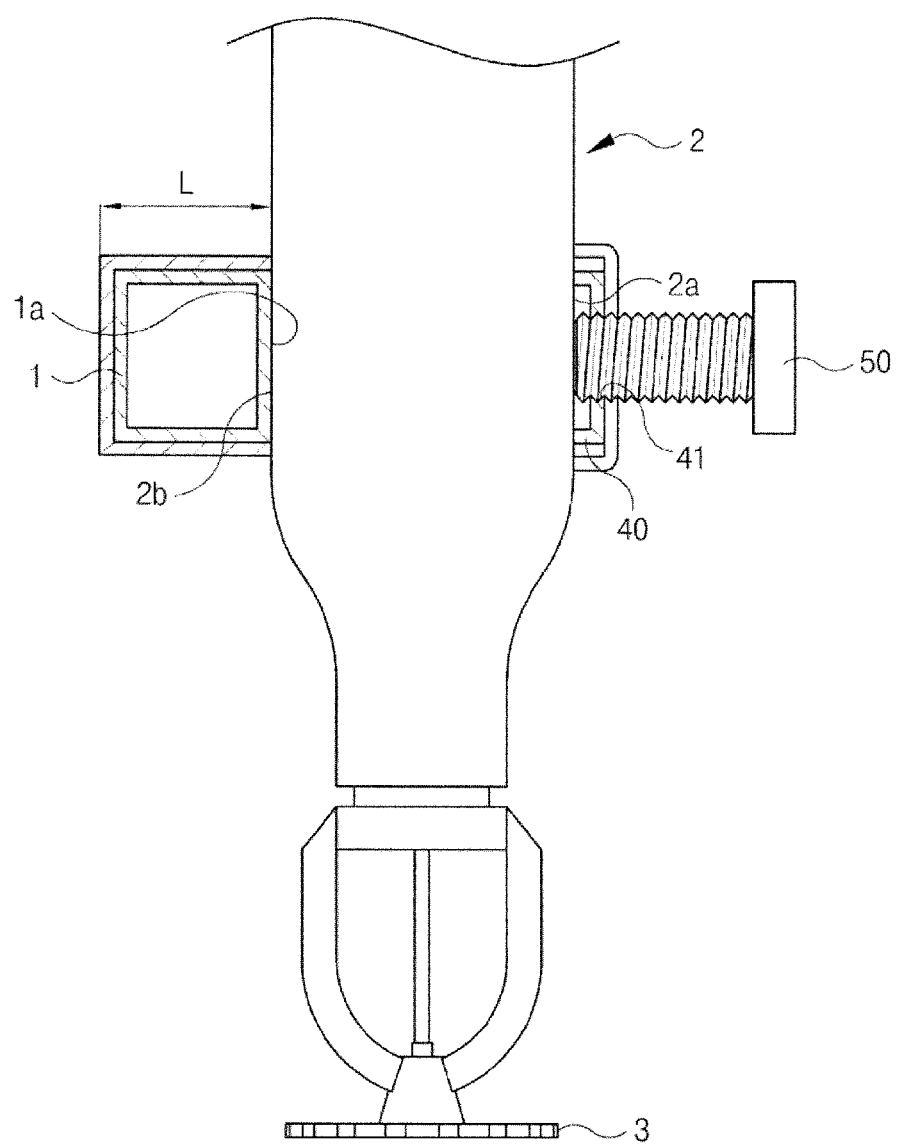
FIG. 4 is a cross-sectional view taken along the line of A-A of FIG. 3.

When the worker tightens the fastening screw 50, as illustrated in FIG. 4, the front end of the fastening screw 50 presses one side 2a of the firefighting pipe so that the other side 2b of the firefighting pipe presses one side 1a of the square pipe. Through the above action, the firefighting pipe 2, the holder 10, and the square pipe 1 can be fixed relatively.

According to an embodiment of the present invention, the pressing plate 40 has a stopper 42 protruding at an end thereof to accurately locate the fastening screw 50 at the center of the opening portions 111 and 121 so as to limit the length that the pressing plate 40 is inserted.

Figure 2:
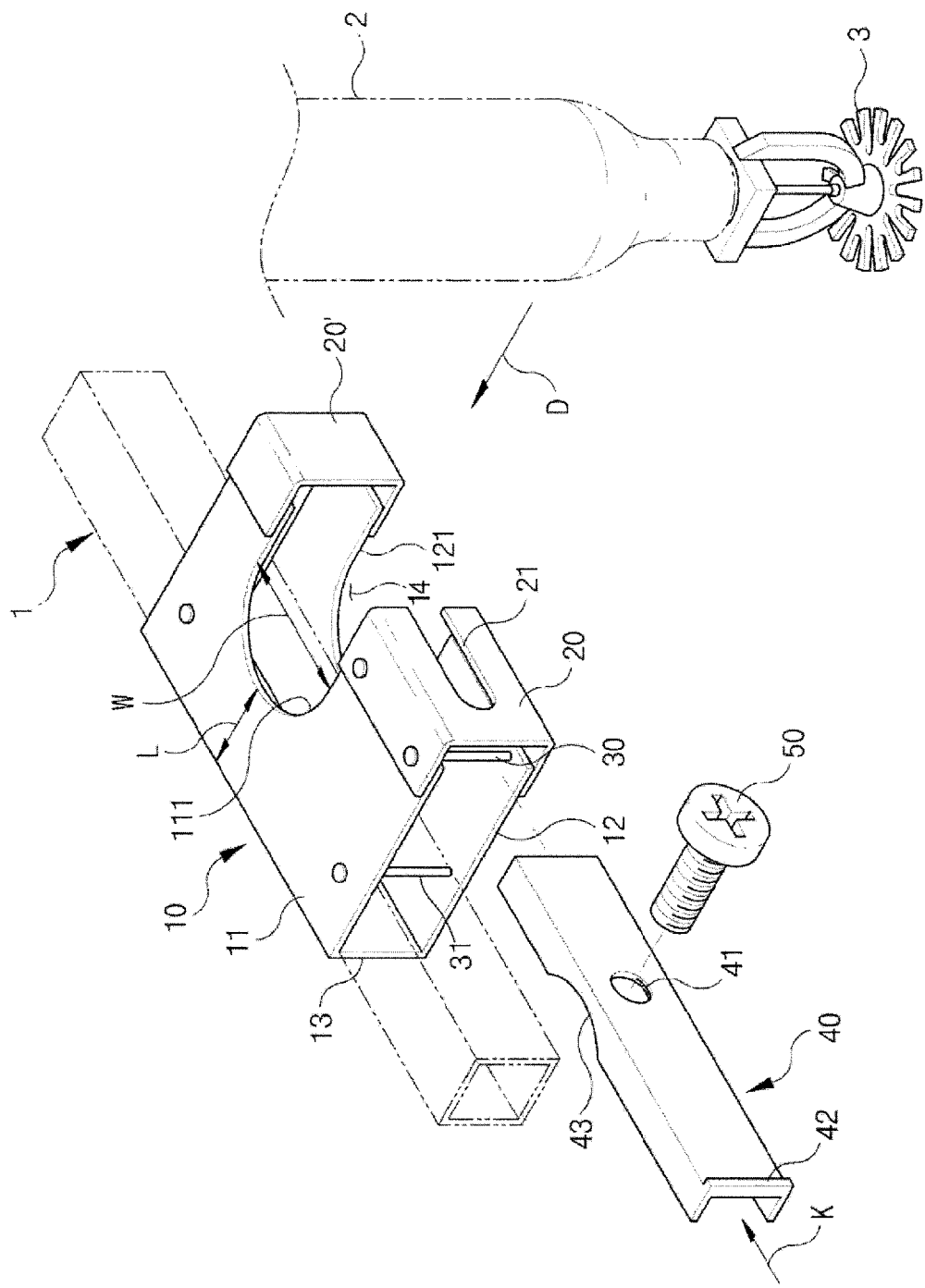
FIG. 2 is a partially exploded perspective view of a firefighting pipe fixing device according to an embodiment of the present invention.
Figure 3:
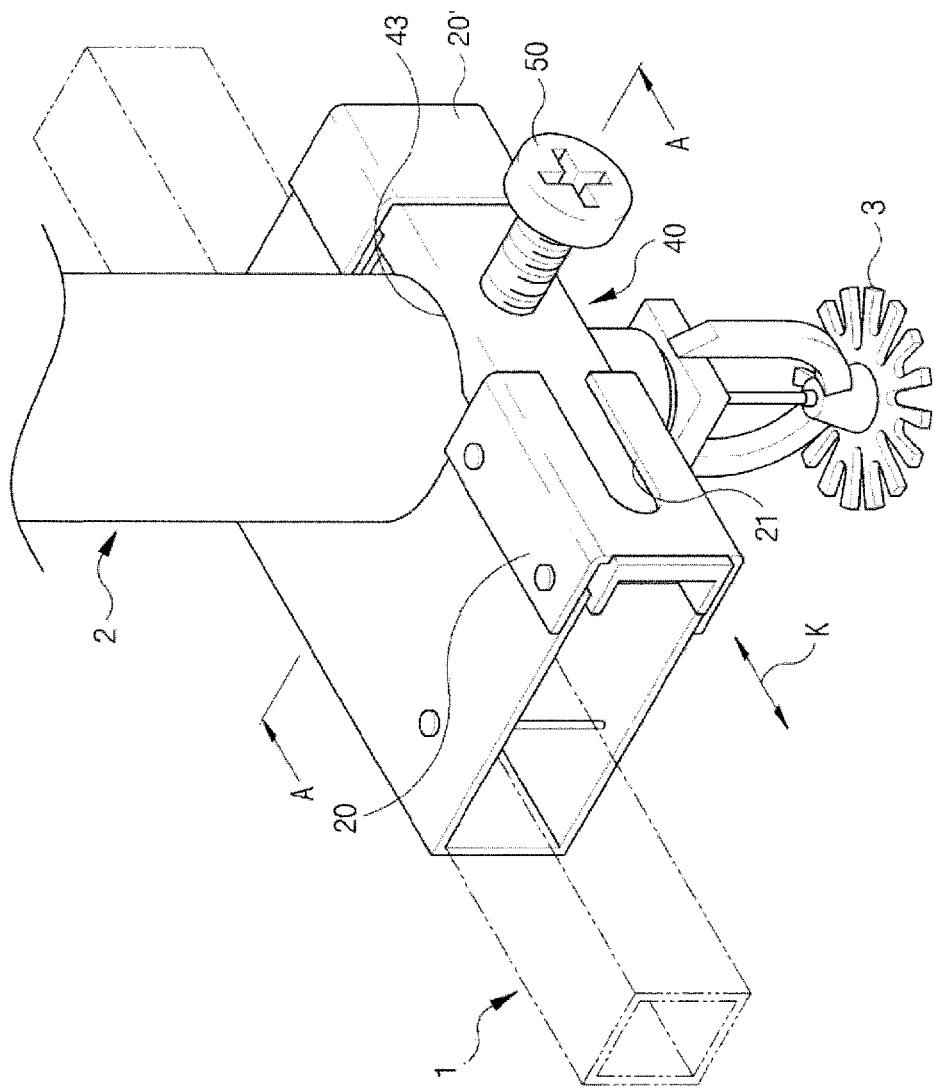
FIG. 3 is a perspective view illustrating an installed state of the firefighting pipe fixing device according to the embodiment of the present invention.

When the worker pushes the pressing plate 40 in the direction as much as possible to close the opening portions 111 and 121 in the arrow K direction of FIG. 2, the fastening screw 50 is located at middle points of the opening portions 111 and 121. Contrariwise, when the worker moves in the direction to open the opening portions 111 and 121 as much as possible, the opening portions 111 and 121 are opened enough to easily insert the firefighting pipe 2.

The pressing plate 40 has an arc-shaped pipe seating surface 43 on which the firefighting pipe 2 is seated in such a way that the outer surface of the firefighting pipe gets in surface contact with the pipe seating surface 43. According to another embodiment of the present invention, the firefighting pipe fixing device includes a pressing plate pressurizing part to pressurize the pressing plate 40 toward the firefighting pipe 2. That is, not the fastening screw 50 but the pressing plate 40 presses the firefighting pipe 2 so that the firefighting pipe 2 can be supported and fixed to the square pipe.

While the exemplary embodiments of the present invention have been described in more detail with reference to the accompanying drawings, but the foregoing is just illustrative of the present invention, and it will be understood by those of ordinary skill in the art that various modifications and equivalents may be made without deviating from the spirit or scope of the invention. For instance, it is to be understood that all embodiments described above may be implemented through free combination by those skilled in the art, and all combinations are intended to be embraced in the scope of the present invention.

What is claimed is:

1. A firefighting pipe fixing device for vertically fixing a firefighting pipe to a square pipe horizontally fixed and mounted adjacent a ceiling of a building, the firefighting pipe fixing device comprising:
   a holder having an upper plate and lower plate parallel to the upper plate joined together by a side plate perpendicular to both the upper plate and the lower plate, and a square pipe insertion path through which the square pipe is passable for resting against the side plate in a rear part of the holder;
   an upper plate opening portion formed in a front part of the upper plate and facing a lower plate opening portion formed in the lower plate that together provide a seating part in the front part of the holder as matching and aligned arch shaped cut-out openings having a width into which the firefighting pipe is insertable;
   a pipe pressing part for insertion into the front part of the holder for fixing the firefighting pipe when positioned in the seating part so as to perpendicularly pass through the upper plate and the lower plate facing a side surface of the square pipe when inserted into the square pipe insertion path,
   wherein the pipe pressing part comprises: a cover plate fixed at end portions of the upper plate and the lower plate of the front part of the holder in parallel with the side plate; a pressing plate for insertion into the holder between the firefighting pipe and the cover plate; and a fastening screw that when screw-coupled to the pressing plate causes a front end of the fastening screw to press a side wall of the firefighting pipe.

2. The firefighting pipe fixing device according to claim 1, wherein the pressing plate is insertable into the holder in a sliding manner, and
   wherein pressing plate guide pins are mounted between the upper plate and the lower plate in order to directionally guide insertion of the pressing plate into the holder in the sliding manner.

3. The firefighting pipe fixing device according to claim 1, wherein the cover plate has a guide groove formed in a direction so that the fixing screw is movable to a position where the fixing screw is coupled to the pressing plate.

4. The firefighting pipe fixing device according to claim 1, wherein the pressing plate has a stopper protruding at an end thereof to accurately locate the fastening screw at the center of the opening portions by limiting a length of insertion of the pressing plate.

\* \* \* \* \*